(12) United States Patent
Kobayashi et al.

(10) Patent No.: US 7,368,500 B2
(45) Date of Patent: May 6, 2008

(54) FILM-FORMING SILICONE RESIN COMPOSITION

(75) Inventors: Hideki Kobayashi, Chiba Prefecture (JP); Motoshi Sasaki, Chiba (JP); Toru Masatomi, Chiba Prefecture (JP)

(73) Assignee: Dow Corning Toray Silicone Co. Ltd., Tokyo (JP)

(*) Notice: Subject to any disclaimer, the term of this patent is extended or adjusted under 35 U.S.C. 154(b) by 48 days.

(21) Appl. No.: 10/484,128

(22) PCT Filed: Jul. 26, 2002

(86) PCT No.: PCT/JP02/07646

§ 371 (c)(1),
(2), (4) Date: May 13, 2004

(87) PCT Pub. No.: WO03/011946

PCT Pub. Date: Feb. 13, 2003

(65) Prior Publication Data

US 2004/0254291 A1    Dec. 16, 2004

(30) Foreign Application Priority Data

Jul. 31, 2001    (JP) .............................. 2001-230925

(51) Int. Cl.
*C08L 83/06* (2006.01)

(52) U.S. Cl. .......................... 524/588; 528/37; 528/32; 525/477

(58) Field of Classification Search ................... 524/37; 528/32; 525/477
See application file for complete search history.

(56) References Cited

U.S. PATENT DOCUMENTS

| | | | |
|---|---|---|---|
| 3,130,221 A * | 4/1964 | Oesterling | .................. 562/113 |
| 3,976,497 A | 8/1976 | Clark | |
| 4,197,230 A | 4/1980 | Baney et al. | |
| 4,221,688 A * | 9/1980 | Johnson et al. | ............. 524/251 |
| 4,223,072 A | 9/1980 | Baney et al. | |
| 4,243,721 A | 1/1981 | Baney et al. | |
| 4,309,319 A | 1/1982 | Vaughn, Jr. | |
| 5,360,851 A * | 11/1994 | Feder et al. | ................ 524/157 |

FOREIGN PATENT DOCUMENTS

JP    58-067728    *    4/1983

* cited by examiner

*Primary Examiner*—Kuo-Liang Peng
(74) *Attorney, Agent, or Firm*—Howard & Howard Attorneys, P.C.

(57) ABSTRACT

A film-forming silicone resin composition, comprising a reaction product obtained by a method comprising the step of heating (A) an alkoxysilyl-functional organopolysiloxane obtained by running an equilibration reaction with components comprising (A1) a polydiorganosiloxane and (A2) an alkylpolysilicate in the presence of (A3) an equilibration polymerization catalyst; (B) colloidal silica, aluminum oxide, antimony oxide, titanium oxide, or zirconium oxide; and (C) water, and a curable film-forming silicone resin composition, comprising above film-forming silicone resin composition and (E) a condensation reaction catalyst.

18 Claims, No Drawings

FILM-FORMING SILICONE RESIN COMPOSITION

TECHNICAL FIELD

This invention relates to a film-forming silicone resin composition and to a curable film-forming silicone resin composition which have superior storage stability and form smooth water-repellent coating films on a variety of substrate surfaces.

BACKGROUND OF THE INVENTION

Prior to this invention, silicone-based aqueous coating agents have included compositions obtained by hydrolyzing methyltrimethoxysilane in an aqueous dispersion of colloidal silica (for example, see U.S. Pat. No. 4,197,230, U.S. Pat. No. 4,223,072, U.S. Pat. No. 4,243,721, U.S. Pat. No. 4,309,319, U.S. Pat. No. 3,976,497). However, the problem with these compositions was their poor storage stability due to the continual hydrolysis of methyltrimethoxysilane over time. In addition, when alcohol was used as the dispersion medium, noxious methanol was generated as a result of the hydrolysis of methyltrimethoxysilane.

Objects of the present invention include providing a film-forming silicone resin composition and a curable film-forming silicone resin composition of superior storage stability which form smooth coating films of superior water repellency on a variety of substrate surfaces.

DISCLOSURE OF INVENTION

A first embodiment of this invention is a film-forming silicone resin composition, comprising a reaction product obtained by a method comprising the step of heating (A) 100 parts by weight of an alkoxysilyl-functional organopolysiloxane obtained by running an equilibration reaction with components comprising (A1) a polydiorganosiloxane and (A2) an alkylpolysilicate in the presence of (A3) an equilibration polymerization catalyst; (B) 5 to 500 parts by weight of colloidal silica, aluminum oxide, antimony oxide, titanium oxide, or zirconium oxide; and (C) 0.1 to 30 parts by weight of water.

A second embodiment of this invention is a curable film-forming silicone resin composition, comprising a reaction product obtained by a method comprising the step of heating (A) 100 parts by weight of an alkoxysilyl-functional organopolysiloxane obtained by running an equilibration reaction with components comprising (A1) a polydiorganosiloxane and (A2) an alkylpolysilicate, in the presence of (A3) an equilibration polymerization catalyst; (B) 5 to 500 parts by weight of colloidal silica, aluminum oxide, antimony oxide, titanium oxide, or zirconium oxide per 100 parts by weight (A); and (C) 0.1 to 30 parts by weight of water per 100 parts by weight (A); and (E) 0.1 to 10 parts by weight of a condensation reaction catalyst per 100 parts by weight of the total of (A) and (B).

The alkoxysilyl-functional organopolysiloxane (A) is obtained by running an equilibration reaction with components comprising (A1) a polydiorganosiloxane and (A2) an alkylpolysilicate in the presence of (A3) an equilibration polymerization catalyst.

Suitable organic groups bonded to the silicon atoms in the polydiorganosiloxane (A1) are exemplified by alkyl groups such as methyl, ethyl, and propyl; alkenyl groups such as vinyl, allyl, 5-hexenyl; aryl groups such as phenyl; and haloalkyl groups such as 3,3,3-trifluoropropyl, and nonafluorohexyl. Specific examples of the polydiorganosiloxane (A1) include polydimethylsiloxane, dimethylsiloxane-phenylmethylsiloxane copolymer, and dimethylsiloxane-diphenylsiloxane copolymer. The molecular structure of the polydiorganosiloxane (A1) may be linear or cyclic. In the case of the linear polydiorganosiloxanes, excessively high viscosities (as measured at 25° C.) should be avoided, and these straight-chain polydiorganosiloxanes can be exemplified by trialkylsiloxy-endblocked (e.g., trimethylsiloxy-endblocked) polydimethylsiloxanes with a degree of polymerization no greater than 100. The cyclic polydiorganosiloxanes can be exemplified by the tetramer (ie. having 4 SiO— groups) to the 30-mer (having 30 SiO— groups). Linear or cyclic polydimethylsiloxanes are preferable, with cyclic polydimethylsiloxanes being even more preferable. Component (A1) can also comprise mixtures of polydimethylsiloxanes having different degrees of polymerization.

The alkylpolysilicate (A2) useful in the present composition comprises a polysiloxane having silicon-bonded alkoxy groups in the molecule. Component (A2) is typically synthesized by the partial hydrolysis and condensation of a tetraalkoxysilane. The alkoxy group can be exemplified by methoxy, ethoxy, propoxy, and isopropoxy, with methoxy being preferred. Examples of component (A2) include methyl polysilicate (which is the partial hydrolysis and condensation product of tetramethoxysilane) and ethyl polysilicate (which is the partial hydrolysis and condensation product of tetraethoxysilane). Preferably, component (A2) is a mixture of polysiloxanes ranging from the dimer to the 100-mer and more preferably is a mixture of polysiloxanes ranging from the dimer to the 20-mer.

Component (A2) is preferably added in an amount from 10 to 1,000 parts by weight per 100 parts by weight of Component (A1) and more preferably in an amount from 20 to 500 parts by weight on the same basis.

The equilibration polymerization catalyst (A3) accelerates the equilibration polymerization reaction of component (A1) and component (A2). Basic catalysts and acid catalysts generally used for the equilibration of siloxanes can be used as component (A3). Examples of component (A3) include basic catalysts such as potassium hydroxide, potassium silanolate, trimethylammonium hydroxide, and trimethylammonium silanolate and acid catalysts such as trifluoromethanesulfonic acid, activated clay, and concentrated sulfuric acid. The acid catalysts are preferred for component (A3).

Component (A3) is added in a catalytic quantity, with a range of 0.0001 to 5 parts by weight per 100 parts by weight component (A1) being preferred and a range of 0.001 to 0.5 parts by weight on the same basis being more preferred.

The equilibration polymerization reaction which produces the alkoxysilyl-functional organopolysiloxane (A) can be run by mixing components (A1), (A2), and (A3), heating the mixture into the temperature range in which the equilibration polymerization catalyst (A3) is active, for example, 50 to 200° C., and allowing the components to react, typically for 1 to 10 hours. The molar ratio of component (A1) to component (A2) is generally from 1:0.1 to 1:10 and preferably is 1:0.2 to 1:5.

After the equilibration reaction, it is preferred to deactivate the equilibration polymerization catalyst. When the equilibration-reaction has been run using a basic catalyst, catalyst deactivation can be achieved via neutralization by mixing in an equivalent amount of an acidic substance, for example, carbon dioxide or hydrogen chloride. When the equilibration reaction has been run using an acid catalyst, catalyst deactivation can be achieved via neutralization by mixing in an equivalent amount of a basic substance, for example, sodium bicarbonate, sodium carbonate, or sodium hydroxide. When the equilibration polymerization catalyst is thermally decomposable, it can be decomposed by raising the temperature by heating. Salts of the catalyst de-activated by neutralization may be left in the reaction solution or removed by filtration.

Preferably, the alkoxysilyl-functional organopolysiloxane comprising component (A) contains 5 to 44 wt %, and more preferably, 10 to 33 wt %, alkoxy groups per molecule. In addition, its weight-average molecular weight is typically not more than 5,000, and, preferably, not more than 3,000. Component (A) may also contain unreacted components (A1) and (A2). Preferably, component (A) comprises no more than 1 wt % of cyclic diorganosiloxane tetramers because the coating properties of the composition may deteriorate above 1 wt %.

Optionally, a functional alkoxysilane (A4) having the general formula $R^1SiR_n(OR^2)_{3-n}$ may be included in the equilibration step along with components (A1), (A2), and (A3). $R^1$ in this general formula is a $C_1$ to $C_{10}$ monovalent organic group containing aliphatically unsaturated bonds. Examples of $R^1$ include vinyl, allyl, 5-hexenyl, 3-methacryloxypropyl, 2-methacryloxyethyl, 3-acryloxypropyl, and 2-acryloxyethyl, with 3-methacryloxypropyl being preferred. Each $R^2$ in the preceding general formula is a $C_1$ to $C_{10}$ alkyl group. Examples of $R^2$ include methyl, ethyl, propyl, and octyl, with methyl being preferred. Each R in the preceding general formula is a substituted or unsubstituted $C_1$ to $C_{10}$ monovalent hydrocarbon group. Examples of R include alkyl groups such as methyl, ethyl, propyl, and hexyl and alkenyl groups such as vinyl and allyl. The subscript n in the preceding general formula is 0 to 2. Examples of component (A4) include vinyltrimethoxysilane, vinylmethyldimethoxysilane, allyltrimethoxysilane, 3-acryloxypropyltrimethoxysilane, 3-methacryloxypropylmethyldimethoxysilane, and 3-methacryloxypropyltrimethoxysilane.

Component (A4) is preferably added in an amount from 0.5 to 100 parts by weight parts per 100 parts by weight of component (A1) and more preferably in an amount from 1 to 50 parts by weight on the same basis.

Component (B) comprises colloidal silica, aluminum oxide, antimony oxide, titanium oxide, or zirconium oxide. Preferably, the colloidal silica, aluminum oxide, antimony oxide, titanium oxide, and zirconium oxide have an average particle size of from 5 to 100 nm, and more preferably, of from 5 to 30 nm. It is also preferable for the colloidal silica, aluminum oxide, antimony oxide, titanium oxide, and zirconium oxide to form a suspension in a dispersion medium. Examples of suitable dispersion media include water, alcohols such as methanol, isopropanol, and ethylene glycol, as well as methylethylketone, methylisobutylketone, dimethylacetamide, and other water-soluble organic solvents. Their concentration in such dispersion medium is preferably 5 to 50 wt %, with 15 to 45 wt % being even more preferable. Preferable forms of component (B) include water-dispersed colloidal silica and alcohol-dispersed colloidal silica, with methanol dispersions and isopropanol dispersions of colloidal silica being examples of the latter. In addition, the water-dispersed colloidal silica and alcohol-dispersed colloidal silica can be used in combination.

Component (B) is added in an amount from 5 to 500 parts by weight per 100 parts by weight of component (A) and preferably from 10 to 400 parts by weight on the same basis. Compositions made with less than 5 parts by weight component (B) do not have sufficient hardness and those made with greater than 500 parts by weight seems to have deteriorated coating characteristics.

Component (C) is water. Water is necessary for the hydrolysis of component (A) in the presence of component (B). Generally, 0.1 to 30 parts by weight water per 100 parts by weight of component (A) is added and preferably 0.2 to 20 parts by weight on the same basis is added.

Optionally, (D) an alkoxysilane represented by the general formula $R_mSi(OR^2)_{4-m}$ can be added during the reaction of components (A), (B), and (C). Component (D) reacts with component (A) and component (B) and strengthens the bond between those two components. In the above formula, R and $R^2$ are the same as described above, and the subscript m is 0 to 3. Examples of component (D) include methyltrimethoxysilane, dimethyldimethoxysilane, methoxytrimethylsilane, methyltriethoxysilane, dimethyldiethoxysilane, and ethoxytrimethylsilane.

Component (D) is preferably added in an amount from 0.1 to 100 parts by weight per 100 parts by weight of component (A) and more preferably, 0.2 to 40 parts by weigh on the same basis.

The order of addition of components (A), (B), (C) and optionally (D) is not restricted. Furthermore, the reaction of these components may be diluted with a water-soluble organic solvent. In addition, although there are no particular limitations concerning the conditions under which they are heated, typically, heating treatment is conducted from 10 minutes to 20 hours at temperatures ranging from 40° C. to the reflux temperature of the water-soluble organic solvent or a dispersion medium for component (B).

It is also preferred to add (F) a silane coupling agent to the film-forming silicone resin composition of the present invention. Examples of useful silane coupling agents include aminosilanes such as 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, 3-(2-aminoethyl)aminopropylmethyldimethoxysilane, and 3-(2-aminoethyl)aminopropylmethyldiethoxysilane; epoxysilanes such as 3-glycidoxypropyltrimethoxysilane, and 3-glycidoxypropylmethyldimethoxysilane; mercaptosilanes such as 3-mercaptopropyltrimethoxysilane; and acryloxysilanes such as 3-methacryloxypropyltrimethoxysilane.

Component (F) is preferably added in an amount from 0.1 to 10 parts by weight per 100 parts by weight of the total of component (A) and component (B), and more preferably, from 0.5 to 10 parts by weight on the same basis.

A second embodiment of this invention is a curable film-forming silicone resin composition, comprising a reaction product obtained by a method comprising the step of heating (A) 100 parts by weight of an alkoxysilyl-functional organopolysiloxane obtained by running an equilibration reaction with components comprising (A1) a polydiorganosiloxane and (A2) an alkylpolysilicate, in the presence of (A3) an equilibration polymerization catalyst; (B) 5 to 500 parts by weight of colloidal silica, aluminum oxide, antimony oxide, titanium oxide, or zirconium oxide per 100 parts by weight (A); and (C) 0.1 to 30 parts by weight of water per 100 parts by weight (A); and (E) 0.1 to 10 parts by weight of a condensation reaction catalyst per 100 parts by weight of the total of (A) and (B).

The second embodiment of the present invention comprises the same components as the first embodiment including optional components described above and additionally includes (E) a condensation reaction catalyst. In order to obtain high-hardness coating films, it is preferable to use a condensation reaction catalyst to cure the composition at room temperature or under heating. Known silanol condensation reaction-promoting catalysts are useful as the condensation catalysts. Examples include tin compounds such as dibutyltin diacetate, dibutyltin dioctoate, dibutyltin dilaurate, dibutyltin dimaleate, dioctyltin dilaurate, dioctyltin dimaleate, and tin octoate; titanium compounds such as isopropyltriisostearoyl titanate, isopropyltris(dioctylpyrophosphate)titanate, bis(dioctylpyrophosphate)oxyacetate titanate, and tetraalkyl titanate, zirconium compounds such as tetrabutyl zirconate, tetrakis(acetylacetonate)zirconium, tetraisobutyl zirconate, butoxytris(acetylacetonate)zirconium, and zirconium naphthenate; aluminum compounds such as tris(ethylacetoacetate)aluminum, and tris(acetylacetonate)aluminum; zinc compounds such as zinc naphthenate, cobalt compounds such as cobalt naphthenate and cobalt octanoate, and other organometallic catalysts; and amine-series catalysts not including organosilicon compounds such as diethanolamine, triethanolamine.

Component (E) is added in an amount from 0.1 to 10 parts by weight per 100 parts by weight of the total of component (A) and component (B) and preferably from 0.5 to 10 parts by weight on the same basis.

For both embodiments, appropriate colorant pigments, extender pigments, rust-preventive pigments, plasticizers, anti-sagging agents, leveling agents, and stain-proofing agents may also be added if necessary.

In addition, the compositions of the present invention may be diluted with an organic solvent. Either individual organic solvent may be used or mixtures of 2 or more organic solvents may be used. Examples of useful solvents include alcohols such as methanol, ethanol, isopropanol, butanol, and isobutanol; esters such as ethyl acetate, butyl acetate, and isobutyl acetate; ketones such as acetone, methylethylketone, and methylisobutylketone; aromatic hydrocarbons such as toluene and xylene; aliphatic hydrocarbons such as hexane, octane, and heptane; organochlorine solvents such as chloroform; and volatile silicones such as hexamethyldisiloxane and octamethyltrisiloxane.

The amount of the organic solvent is preferably not more than 100 parts by weight per 100 parts by weight of the total of component (A) and component (B) and more preferably, not more than 90 parts by weight on the same basis.

BEST MODE FOR CARRYING OUT THE INVENTION

The invention is explained below through working examples, disclosed to further teach, but not limit, the invention, which is properly delineated by the appended claims. In the examples, the term "viscosity" refers to a value measured at 25° C., and "water contact angle" refers to a value measured using a contact angle meter(CA-Z from Kyowa Kaimen Kagaku Kabushiki Kaisha).

SYNTHESIS EXAMPLE 1

148 g cyclic dimethylsiloxane (a mixture of tetramers to decamers) and 117.5 g methylpolysilicate (average molecular weight: 550, $SiO_2$ content: 51 wt %, viscosity: 10 mPa·s), a product of partial hydrolysis and condensation of tetramethoxysilane, were placed in a flask and subjected to agitation, during which 0.3 g trifluoromethanesulfonic acid was added thereto. Subsequently, the mixture was heated to 70° C. and stirred for 8 hours. Gas chromatography analysis of the reaction solution under agitation confirmed formation of numerous peaks and showed that an equilibration reaction between the cyclic dimethylsiloxane and methylpolysilicate had taken place. Subsequently, the catalyst was de-activated by blowing in ammonia gas, and salts of neutralization were filtered off after cooling the solution to room temperature. After filtration, the solution was moved to a rotary evaporator, where it was subjected to stripping under reduced pressure, yielding 235 g methoxysilyl-functional polymethylsiloxane (siloxane A). The viscosity of the resultant polymethylsiloxane was 17 $mm^2$/s, its external appearance being transparent. GC analysis of the polymethylsiloxane confirmed that it was an equilibration reaction product with a distribution close to 2~20-mers, and showed that the content of octamethylcyclotetrasiloxane was not more than 1 wt %. In addition, the content of methoxy groups was 27 wt %, and its weight-average molecular weight, as determined by GPC, was 3,500.

SYNTHESIS EXAMPLE 2

148 g cyclic dimethylsiloxane (a mixture of tetramers to decamers) and 235 g methylpolysilicate (average molecular weight: 550, $SiO_2$ content: 51 wt %, viscosity: 10 mPa·s), a product of partial hydrolysis and condensation of tetramethoxysilane, were placed in a flask and subjected to agitation, during which 0.4 g trifluoromethanesulfonic acid was added thereto. Subsequently, the mixture was heated to 70° C. and stirred for 8 hours. Gas chromatography analysis of the reaction solution under agitation confirmed formation of numerous peaks and showed that an equilibration reaction between the cyclic dimethylsiloxane and methylpolysilicate had taken place. Subsequently, the catalyst was de-activated by blowing in ammonia gas, and salts of neutralization were filtered off after cooling the solution to room temperature. After filtration, the solution was moved to a rotary evaporator, where it was subjected to stripping under reduced pressure, yielding 360 g methoxysilyl-functional polymethylsiloxane (siloxane B). The viscosity of the resultant polymethylsiloxane was 10 $mm^2$/s, its external appearance being transparent. GC analysis of the polymethylsiloxane confirmed that it was an equilibration reaction product with a distribution close to 2~20-mers, and showed that the content of octamethylcyclotetrasiloxane was not more than 1 wt %. In addition, the content of methoxy groups was 36 wt %, and its weight-average molecular weight, as determined by GPC, was 1,500.

SYNTHESIS EXAMPLE 3

161 g cyclic dimethylsiloxane (a mixture of tetramers to decamers), 230 g methylpolysilicate (average molecular weight: 550, $SiO_2$ content: 51 wt %, viscosity: 10 mPa·s), a product of partial hydrolysis and condensation of tetramethoxysilane, and 54 g 3-methacryloxypropyltrimethoxysilane were placed in a flask and subjected to agitation, during which 0.4 g trifluoromethanesulfonic acid was added thereto. Subsequently, the mixture was heated to 70° C. and stirred for 8 hours. Gas chromatography analysis of the reaction solution under agitation confirmed formation of numerous peaks and showed that an equilibration reaction between the cyclic dimethylsiloxane, methylpolysilicate, and 3-methacryloxypropyltrimethoxysilane had taken place. Subsequently, the catalyst was deactivated by blowing in ammonia gas, and salts of neutralization were filtered off after cooling the solution to room temperature. After filtration, the solution was moved to a rotary evaporator, where it was subjected to stripping under reduced pressure, yielding 490 g methoxysilyl-functional polymethylsiloxane (siloxane C). The viscosity of the resultant polymethylsiloxane was 7 mm²/s, its external appearance being transparent. GC analysis of the polymethylsiloxane showed that the content of octamethylcyclotetrasiloxane was not more than 1 wt %. In addition, the content of methoxy groups was 35 wt %.

APPLICATION EXAMPLE 1

48 g methanol dispersion of colloidal silica (average particle size: 10 nm, concentration: 25 wt %), 40 g siloxane A obtained in Synthesis Example 1, and 25 g isopropanol were placed in a flask and subjected to agitation, during which 5.3 g water was added in a dropwise manner. Subsequently, 0.16 g acetic acid was added to the solution, and the solution was heated and refluxed at 70° C. for 2 hours. After cooling, silicone resin solution A was obtained by adding another 50 g isopropanol. A silicone resin composition was then prepared by combining 0.05 g 3-glycidoxypropyltrimethoxysilane and 0.05 g dibutyltin diacetate, as a curing catalyst, with 10 g silicone resin solution A.

After curtain coating the thus prepared composition on the surface of a glass slide, it was cured by heat treatment at 150° C. for 1 hour. The surface of the resultant cured coating film was smooth, with a water contact angle of 96° and a pencil hardness of 4H.

Furthermore, in the same manner as described above, the resultant composition was coated and cured on the surface of an iron plate and an aluminum plate. It was found that each of the resultant cured coating films was firmly bonded to it, exhibiting superior adhesion to the substrate.

In addition, the above-described silicone resin solution A exhibited no changes in its external appearance and viscosity and remained stable after being hermetically sealed in a glass vial and stored for 2 months at room temperature.

APPLICATION EXAMPLE 2

48 g methanol dispersion of colloidal silica (average particle size: 10 nm, concentration: 25 wt %), 40 g siloxane B obtained in Synthesis Example 2, 4 g methyltrimethoxysilane, and 25 g isopropanol were placed in a flask and subjected to agitation, during which 5.4 g water was added thereto in a dropwise manner. Subsequently, 0.16 g acetic acid was added to the solution, and the solution was heated and refluxed at 70° C. for 2 hours. After cooling, silicone resin solution B was obtained by adding another 50 g isopropanol. A silicone resin composition was then prepared by combining 0.05 g 3-glycidoxypropyltrimethoxysilane and 0.05 g dibutyltin diacetate, as a curing catalyst, with 10 g silicone resin solution B.

After curtain coating the thus prepared composition on the surface of a glass slide, it was cured by heat treatment at 150° C. for 1 hour. The surface of the resultant cured coating film was smooth, with a water contact angle of 95° and a pencil hardness of 4H.

In addition, the above-described silicone resin solution B exhibited no changes in its external appearance and viscosity and remained stable after being hermetically sealed in a glass vial and stored for 2 months at room temperature.

APPLICATION EXAMPLE 3

48 g methanol dispersion of colloidal silica (average particle size: 10 nm, concentration: 25 wt %), 40 g siloxane C obtained in Synthesis Example 3, and 25 g isopropanol were placed in a flask and subjected to agitation, during which 5 g water was added thereto in a dropwise manner. Subsequently, 0.2 g acetic acid was added to the solution, and the solution was heated and refluxed at 70° C. for 2 hours. After cooling, silicone resin solution C was obtained by adding another 50 g isopropanol. A silicone resin composition was then prepared by combining 0.05 g 3-glycidoxypropyltrimethoxysilane and 0.05 g dibutyltin diacetate, as a curing catalyst, with 10 g silicone resin solution C.

After curtain coating the thus prepared composition on the surface of a glass slide, it was cured by heat treatment at 150° C. for 1 hour. The surface of the resultant cured coating film was smooth, with a water contact angle of 96° and a pencil hardness of 3H.

In addition, the above-described silicone resin solution C exhibited no changes in its external appearance and viscosity and remained stable after being hermetically sealed in a glass vial and stored for 2 months at room temperature.

APPLICATION EXAMPLE 4

A silicone resin composition was prepared by combining 0.05 g dibutyltin diacetate, as a curing catalyst, with 10 g silicone resin solution A obtained in Application Example 1. After curtain coating the resultant composition on the surface of a glass slide, it was cured by heat treatment at 150° C. for 1 hour. The surface of the resultant cured coating film was smooth, with a water contact angle of 96° and a pencil hardness of 3H.

Furthermore, in the same manner as described above, the resultant composition was cured on the surface of an iron plate and an aluminum plate. Although the adhesion of both resultant cured coating films was excellent, their adhesion was not as firm as in Application Example 1.

COMPARATIVE EXAMPLE 1

48 g methanol dispersion of colloidal silica (average particle size: 10 nm, concentration: 25 wt %), 40 g siloxane A obtained in Synthesis Example 1, 75 g isopropanol, 5.3 g water, and 0.16 g acetic acid were placed in a flask and mixed at room temperature, yielding a silicone resin solution X. A silicone resin composition was prepared by combining 0.05 g dibutyltin diacetate, as a curing catalyst, with 10 g silicone resin solution X. After curtain coating the thus obtained composition on the surface of a glass slide, it was subjected to heat treatment at 150° C. for 1 hour, but because of insufficient cure, it was impossible to obtain a cured coating film of superior quality.

Because both embodiments comprise a reaction product of components (A), (B) and (C) and optionally (D), the compositions of the present invention as described above have excellent storage stability when stored over an extended period of time in reaction product form. Furthermore, smooth water-repellent coating films can be formed on a variety of substrate surfaces when said reaction product is baked or if a catalyst for curing the composition is added. In order to obtain high-hardness coating films, it is preferable to use a condensation reaction catalyst (E) to cure the composition at room temperature or under heating. The compositions of the present invention are useful as coating agents for various organic materials and inorganic materials, such as metals, ceramics, glass, etc.

What is claimed is:
1. A film-forming silicone resin composition, consisting essentially of a reaction product obtained by a method comprising the step of heating a composition consisting essentially of:
 (A) 100 parts by weight of an alkoxysilyl-functional organopolysiloxane obtained by running an equilibra- tion reaction with components comprising (A1) a polydiorganosiloxane and (A2) an alkylpolysilicate in the presence of (A3) an acid catalyst;
(B) 5 to 500 parts by weight of a material selected from the group consisting of colloidal silica, aluminum oxide, antimony oxide, titanium oxide, and zirconium oxide;
(C) 0.1 to 30 parts by weight of water; and
(D) 0.1 to 100 parts by weight of an alkoxysilane with the general formula $R_mSi(OR^2)_{4-m}$, where each R is a substituted or unsubstituted $C_1$ to $C_{10}$ monovalent hydrocarbon group, each $R^2$ is a $C_1$ to $C_{10}$ alkyl group, and m is 0 to 3.

2. The film-forming silicone resin composition according to claim 1, wherein the alkoxysilyl-functional organopolysiloxane (A) is obtained by running an equilibration reaction with components comprising (A1) a polydiorganosiloxane, (A2) an alkylpolysilicate, and (A4) a functional alkoxysilane with the general formula $$R^1SiR_n(OR^2)_{3-n},$$

where each R is a substituted or unsubstituted $C^1$ to $C^{10}$ monovalent hydrocarbon group, $R^1$ is a $C_1$ to $C_{10}$ monovalent organic group having aliphatic unsaturated bonds, each $R^2$ is a $C_1$ to $C_{10}$ alkyl group, and n is 0 to 2, in the presence of (A3) an acid catalyst.

3. The film-forming silicone resin composition according to claim 1, in which the alkoxysilyl-functional organopolysiloxane of component (A) comprises no more than 1 wt % cyclic diorganosiloxane tetramers.

4. A curable film-forming silicone resin composition, consisting essentially of a reaction product obtained by a method comprising the step of heating a composition consisting essentially of:
(A) 100 parts by weight of an alkoxysilyl-functional organopolysiloxane obtained by running an equilibration reaction with components comprising (A1) a polydiorganosiloxane and (A2) an alkylpolysilicate, in the presence of (A3) an acid catalyst;
(B) 5 to 500 parts by weight per 100 parts by weight (A) of materials selected from the group consisting of colloidal silica, aluminum oxide, antimony oxide, titanium oxide, and zirconium oxide; and
(C) 0.1 to 30 parts by weight of water per 100 parts by weight (A); and
(E) 0.1 to 10 parts by weight per 100 parts by weight of the total of (A) and (B) of a condensation reaction catalyst.

5. The curable film-forming silicone resin composition according to claim 4 wherein the alkoxysilyl-functional organopolysiloxane (A) is obtained by running an equilibration reaction with components comprising (A1) a polydiorganosiloxane, (A2) an alkylpolysilicate, and (A4) a functional alkoxysilane with the general formula $R^1SiR_n(OR^2)_{3-n}$ where each R is a substituted or unsubstituted $C_1$ to $C_{10}$ monovalent hydrocarbon group, $R^1$ is a $C_1$ to $C_{10}$ monovalent organic group having aliphatic unsaturated bonds, each $R^2$ is a $C_1$ to $C_{10}$ alkyl group, and n is 0 to 2, in the presence of (A3) an acid catalyst.

6. The curable film-forming silicone resin composition according to claim 5, in which the alkoxysilyl-functional organopolysiloxane of component (A) comprises no more than 1 wt % cyclic diorganosiloxane tetramers.

7. The curable film-forming silicone resin composition according to claim 4, in which the alkoxysilyl-functional organopolysiloxane of component (A) comprises no more than 1 wt % cyclic diorganosiloxane tetramers.

8. A curable film-forming silicone resin composition, consisting essentially of a reaction product obtained by a method comprising the step of heating a composition consisting essentially of:
(A) 100 parts by weight of an alkoxysilyl-functional organopolysiloxane obtained by running an equilibration reaction with components comprising (A1) a polydiorganosiloxane and (A2) an alkylpolysilicate, in the presence of (A3) an acid catalyst;
(B) 5 to 500 parts by weight per 100 parts by weight (A) of materials selected from the group consisting of colloidal silica, aluminum oxide, antimony oxide, titanium oxide, and zirconium oxide;
(C) 0.1 to 30 parts by weight of water per 100 parts by weight (A); and
(D) 0.1 to 100 parts by weight per 100 parts by weight of component (A) of an alkoxysilane with the general formula $R_m Si(OR^2)_{4-m}$, where each R is a substituted or unsubstituted $C_1$ to $C_{10}$ monovalent hydrocarbon group, each $R^2$ is a $C_1$ to $C_{10}$ alkyl group, and m is 0 to 3; and
(E) 0.1 to 10 parts by weight per 100 parts by weight of the total of (A) and (B) of a condensation reaction catalyst.

9. The curable film-forming silicone resin composition according to claim 8, wherein the alkoxysilyl-functional organopolysiloxane (A) is obtained by running an equilibration reaction with components comprising (A1) a polydiorganosiloxane, (A2) an alkylpolysilicate, and (A4) a functional alkoxysilane with the general formula $R^1SiR_n(OR^2)_{3-n}$ where each R is a substituted or unsubstituted $C_1$ to $C_{10}$ monovalent hydrocarbon group, $R^1$ is a $C_1$ to $C_{10}$ monovalent organic group having aliphatic unsaturated bonds, each $R^2$ is a $C_1$ to $C_{10}$ alkyl group, and n is 0 to 2, in the presence of (A3) an acid catalyst.

10. The curable film-forming silicone resin composition according to claim 8, in which the alkoxysilyl-functional organopolysiloxane of component (A) comprises no more than 1 wt % cyclic diorganosiloxane tetramers.

11. A film-forming silicone resin composition, consisting essentially of a reaction product obtained by a method comprising the step of heating a composition consisting essentially of:
(A) 100 parts by weight of an alkoxysilyl-functional organopolysiloxane obtained by running an equilibration reaction with components comprising (A1) a polydiorganosiloxane and (A2) an alkylpolysilicate in the presence of (A3) an acid catalyst;
(B) 5 to 500 parts by weight of a material selected from the group consisting of colloidal silica, aluminum oxide, antimony oxide, titanium oxide, and zirconium oxide;
(C) 0.1 to 30 parts by weight of water;
optionally, (D) 0.1 to 100 parts by weight per 100 parts by weight of component (A) of an alkoxysilane with the general formula $R_m Si(OR^2)_{4-m}$, where each R is a substituted or unsubstituted $C_1$ to $C_{10}$ monovalent hydrocarbon group, each $R^2$ is a $C_1$ to $C_{10}$ alkyl group, and m is 0 to 3;
optionally, (E) 0.1 to 10 parts by weight per 100 parts by weight of the total of (A) and (B) of a condensation reaction catalyst; and optionally, (F) 0.1 to 10 parts by weight of a silane coupling agent per 100 parts by weight of the total of component (A) and component (B).

12. The film-forming silicone resin composition according to claim 11, wherein the alkoxysilyl-functional organopolysiloxane (A) is obtained by running an equilibration reaction with components comprising (A1) a polydiorganosiloxane, (A2) an alkylpolysilicate, and (A4) a functional alkoxysilane with the general formula $R^1SiR_n(OR^2)_{3-n}$, where each R is a substituted or unsubstituted $C_1$ to $C_{10}$ monovalent hydrocarbon group, $R^1$ is a $C_1$ to $C_{10}$ monovalent organic group having aliphatic unsaturated bonds, each $R^2$ is a $C_1$ to $C_{10}$ alkyl group, and n is 0 to 2, in the presence of (A3) an acid catalyst.

13. The film-forming silicone resin composition according to claim 12, in which the alkoxysilyl-functional organopolysiloxane of component (A) comprises no more than 1 wt % cyclic diorganosiloxane tetramers.

14. The film-forming silicone resin composition according to claim 12, and further comprising component (F).

15. The film-forming silicone resin composition according to claim 11, in which the alkoxysilyl-functional organopolysiloxane of component (A) comprises no more than 1 wt % cyclic diorganosiloxane tetramers.

16. The film-forming silicone resin composition according to claim 15, and further comprising component (F).

17. The film-forming silicone resin composition according to claim 11, and further comprising component (F).

18. The film-forming silicone resin composition according to claim 11, wherein component (B) is dispersed in water or in a water-soluble organic solvent.

* * * * *

UNITED STATES PATENT AND TRADEMARK OFFICE
CERTIFICATE OF CORRECTION

PATENT NO. : 7,368,500 B2
APPLICATION NO. : 10/484128
DATED : May 6, 2008
INVENTOR(S) : Hideki Kobayashi et al.

It is certified that error appears in the above-identified patent and that said Letters Patent is hereby corrected as shown below:

Column 9, line 54, after "formula" delete "$R_1SiR_n(OR^2)_{3-n}$" and insert therein -- $R^1SiR_n(OR^2)_{3-n}$ --.

Column 10, line 30, after "formula" delete "$R_1SiR_n(OR^2)_{3-n}$" and insert therein -- $R^1SiR_n(OR^2)_{3-n}$ --.

Column 10, line 62, start a new paragraph after "and" and before "optionally".

Signed and Sealed this

Twenty-third Day of December, 2008

JON W. DUDAS
*Director of the United States Patent and Trademark Office*